(12) United States Patent
Tsujii et al.

(10) Patent No.: US 7,483,625 B2
(45) Date of Patent: *Jan. 27, 2009

(54) PICTURE RECORDING APPARATUS AND METHOD THEREOF

(75) Inventors: Satoshi Tsujii, Tokyo (JP); Makoto Yamada, Tokyo (JP)

(73) Assignee: Sony Corporation, Tokyo (JP)

( * ) Notice: Subject to any disclaimer, the term of this patent is extended or adjusted under 35 U.S.C. 154(b) by 680 days.

This patent is subject to a terminal disclaimer.

(21) Appl. No.: 11/168,658

(22) Filed: Jun. 28, 2005

(65) Prior Publication Data

US 2005/0238332 A1    Oct. 27, 2005

Related U.S. Application Data

(63) Continuation of application No. 09/726,955, filed on Nov. 30, 2000, now Pat. No. 6,928,234.

(51) Int. Cl.
  *H04N 7/00* (2006.01)
  *H04N 5/00* (2006.01)
(52) U.S. Cl. ................................ 386/109; 386/125
(58) Field of Classification Search ............ 386/69, 386/111, 112, 109, 45, 46
See application file for complete search history.

(56) References Cited

U.S. PATENT DOCUMENTS 5,164,831 A    11/1992  Kuchta et al.
5,377,051 A *  12/1994  Lane et al. .................. 386/81
5,847,703 A    12/1998  Teicher et al.
5,956,453 A     9/1999  Yaegashi et al.

FOREIGN PATENT DOCUMENTS

| EP | 0 685 967    | 12/1995 |
| EP | 0 932 158    | 7/1999  |
| EP | 000932158 A2 | 7/1999  |
| JP | 6 217249     | 8/1994  |
| JP | 9 93588      | 4/1997  |
| JP | 10 66061     | 3/1998  |
| JP | 10 164483    | 6/1998  |
| JP | 11 103439    | 4/1999  |
| JP | 11 284948    | 10/1999 |
| JP | 11 308620    | 11/1999 |
| WO | WO 98 34181  | 8/1998  |

* cited by examiner

*Primary Examiner*—Robert Chevalier
(74) *Attorney, Agent, or Firm*—Frommer Lawrence & Haug LLP; William S. Frommer

(57) ABSTRACT

A picture recording apparatus for compression-encoding a moving picture sequence and recording the resultant data to a record medium is disclosed, that comprises an encoding unit for compression-encoding an input moving picture sequence, a recording unit for recording the compression-encoded data generated by the encoding unit to a record medium, and a picture generating unit for extracting a plurality of pictures from the input moving picture sequence at irregular intervals and generating reduced pictures with the extracted pictures while the compression-encoded data being recorded to the record medium.

24 Claims, 17 Drawing Sheets

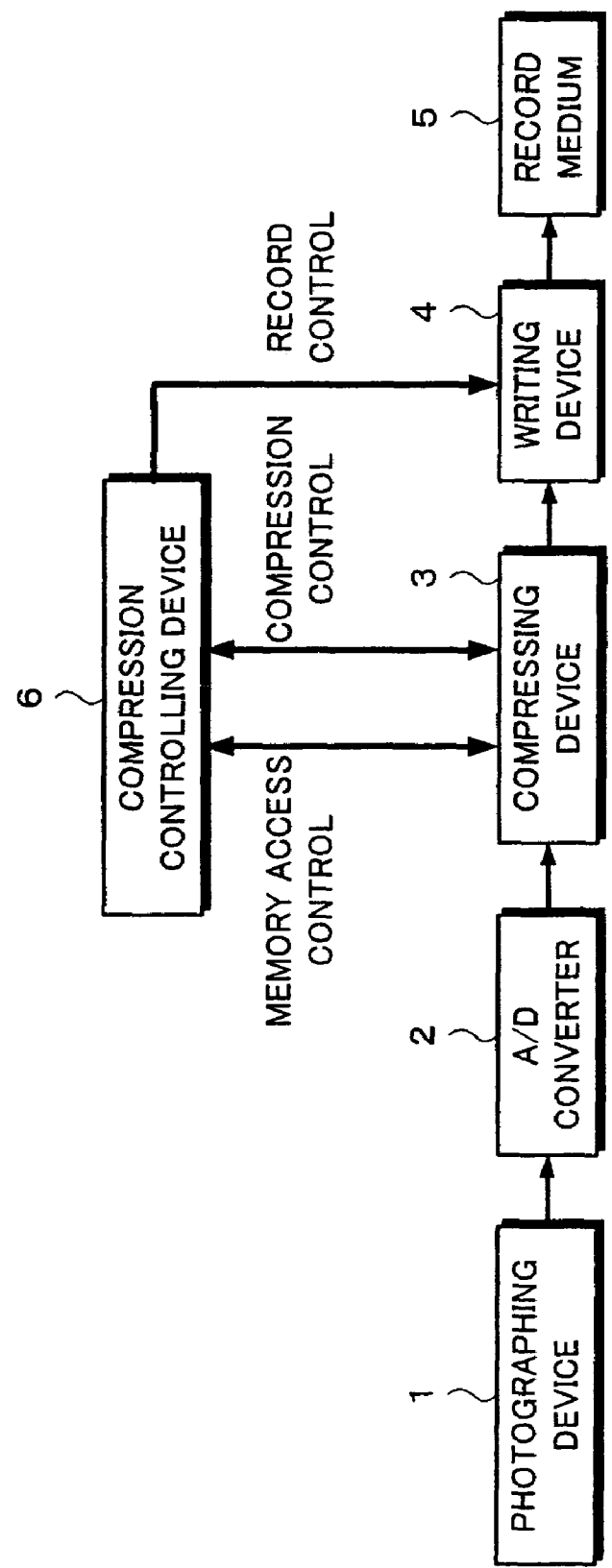

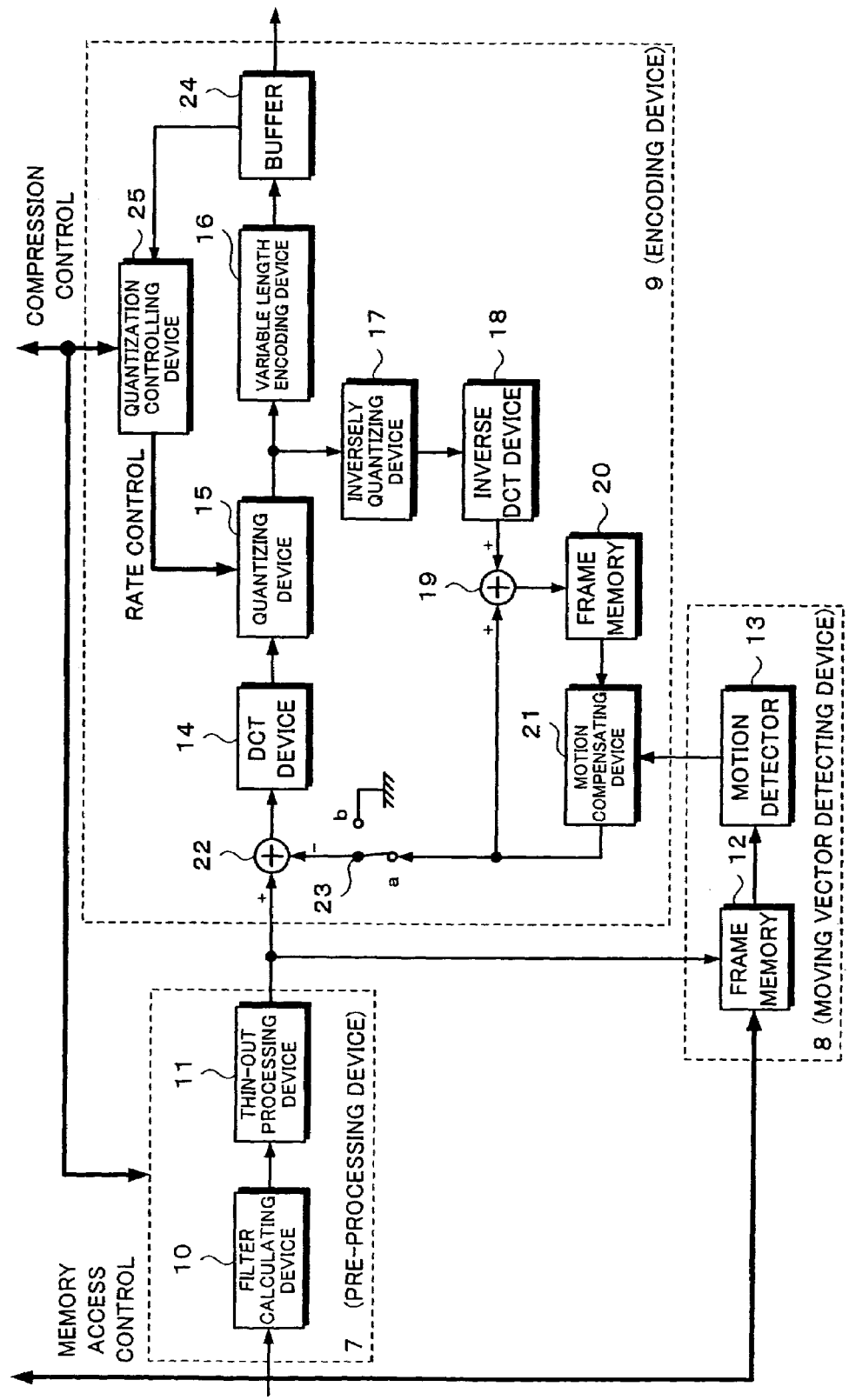

THUMBNAIL PICTURE FRAME MAP

PICTURE RECORDING APPARATUS AND METHOD THEREOF

This is a continuation of application Ser. No. 09/726,955, filed Nov. 30, 2000 now U.S. Pat. No. 6,928,234, the entirety of which is incorporated herein by reference.

BACKGROUND OF THE INVENTION

1. Field of the Invention

The present invention relates to a recording apparatus for compressing a picture signal of a photographed moving picture and recording the compressed picture signal to a record medium and a recording method thereof.

2. Description of the Related Art

In a digital still picture camera, a reduced picture of a photographed picture is generated and recorded as an index (this reduced picture is referred to as thumbnail picture). In such a still picture camera, a thumbnail picture can be affordably generated. In the case of a moving picture camera using a tape as a record medium, thumbnail pictures can be generated using a moving picture sequence recorded on the tape. However, it is not practical to reference thumbnail pictures and search them for a desired picture because of low accessibility of the tape.

However, in a moving picture camera using a semiconductor memory as a record medium, a searching function and a top position detecting function for a desired moving picture from the recorded moving picture sequence are important functions so as to effectively use the random accessibility of the semiconductor memory. In this case, to allow the user to know the content of each moving picture sequence, it is important to generate thumbnail moving pictures. However, to do that, time and labour of the user are required.

OBJECTS AND SUMMARY OF THE INVENTION

Therefore, an object of the present invention is to provide a picture recording apparatus and a method thereof that allow a thumbnail moving picture to be generated without labour and time of the user.

A first aspect of the present invention is a picture recording apparatus for compression-encoding a moving picture sequence and recording the resultant data to a record medium, comprising an encoding means for compression-encoding an input moving picture sequence, a recording means for recording the compression-encoded data generated by the encoding means to a record medium, and a picture generating means for extracting a plurality of pictures from the input moving picture sequence at irregular intervals and generating reduced pictures with the extracted pictures while the compression-encoded data being recorded to the record medium.

A second aspect of the present invention is a picture recording method for compression-encoding a moving picture sequence and recording the resultant data to a record medium, comprising the steps of (a) compression-encoding an input moving picture sequence, (b) recording the compression-encoded data generated at step (a) to a record medium, and (c) extracting a plurality of pictures from the input moving picture sequence at irregular intervals and generating reduced pictures with the extracted pictures while the compression-encoded data being recorded to the record medium.

According to the present invention, while an input moving picture sequence is being compressed and recorded, a reduced moving picture sequence is automatically extracted from the input picture sequence. Thus, it is not necessary to perform a reduced moving picture generating process. When the user reproduces a recorded moving picture sequence, he or she can easily know the content thereof with reference to the reduced moving picture sequence. In addition, since each reduced picture sequence is generated using a picture sequence at a change point of the input moving picture sequence, the user can easily and effectively know the content of the photographed moving picture sequence.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 1 is a block diagram showing the structure of an embodiment of the present invention;

FIG. 2 is a block diagram showing the detailed structure of a principle portion of the embodiment of the present invention;

DETAILED DESCRIPTION OF THE PREFERRED EMBODIMENTS

Figure 3A:
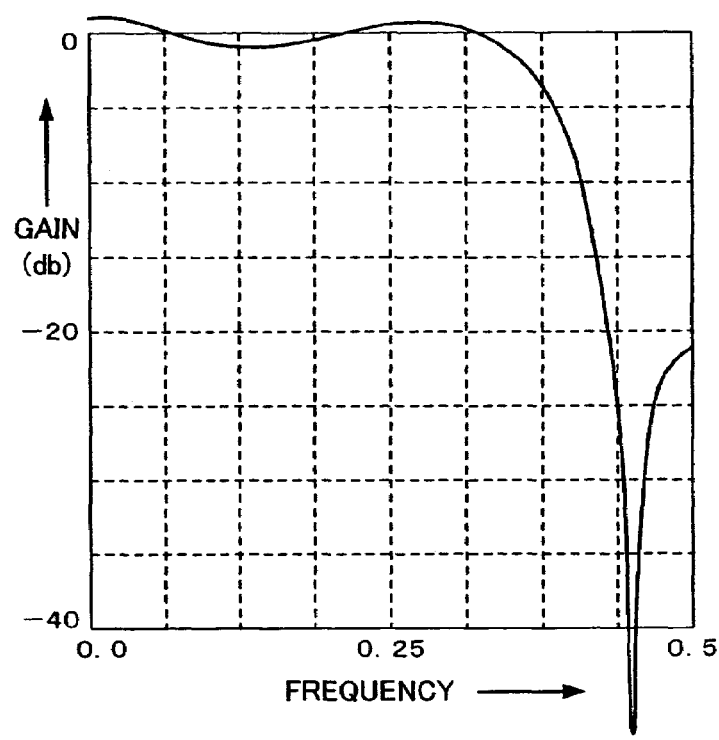
FIGS. 3A and 3B are graphs showing examples of a characteristic of a filter of a pre-processing device according to the embodiment of the present invention.

Next, with reference to the accompanying drawings, an embodiment of the present invention will be described. According to the embodiment, a thumbnail picture generating function is built in a picture compressing system that records compression-encoded data to a record medium. The picture compressing system is for example a camera that photographs a moving picture and records the photographed moving picture.

FIG. 1 shows the overall structure of a moving picture compression recording apparatus according to the embodiment of the present invention. In FIG. 1, reference numeral 1 is a photographing device composed of an image pickup device such as a CCD (Charge Coupled Device) and an optical system such as a lens. Reference numeral 2 is an A/D converter that digitizes a picture signal photographed by the photographing device 1. The picture signal digitized by the A/D converter 2 is input to a compressing device 3. The compressing device 3 compression-encodes the picture signal and generates a bit stream. The bit stream is recorded by a writing device 4 to a record medium 5. The record medium 5 is for example an optical disc, a magnetic disc, or a semiconductor memory. The record medium 5 is preferably a medium having high random accessibility. A compression controlling device 6 exchanges an encoded parameter mainly with the compressing device 3. In addition, the compression controlling device 6 accesses a frame memory of the compressing device 3 so as to generate a thumbnail picture. Moreover, the compression controlling device 6 starts and stop writing the bit stream to the writing device 4.

The example shown in FIG. 1 is expected to be an application as a digital video camera that records and reproduces a signal to/from a record medium.

FIG. 2 shows an example of the structure of the compressing device 3 shown in FIG. 1. A digital picture signal that is output from the A/D converter 2 shown in FIG. 1 is supplied as an input signal to the compressing device 3. A bit stream compressed and encoded corresponding to an encoding parameter exchanged between the compressing device 3 and the compression controlling device 6 is output from the compressing device 3. In addition, the compression controlling device 6 accesses data of the frame memory so as to generate a thumbnail reduced picture. The compressing device 3 is composed of a pre-processing device 7, a moving vector detecting device 8, and an encoding device 9. The pre-processing device 7 properly performs a resolution converting process and a "number of pixels" converting process for the input picture sequence. The moving vector detecting device 8 obtains a moving amount between two adjacent frames. The encoding device 9 encodes the input signal and generates a bit stream.

The pre-processing device 7 is composed of a filter calculating device 10 and a thin-out processing device 11. The filter calculating device 10 converts the resolution (namely, the frequency characteristic) for a picture to be encoded under the control of the compression controlling device 6. The thin-out processing device 11 converts the number of pixels (namely, the number of samples) of the picture to be encoded. As an example of the resolution converting process and the "number of pixels" converting process of the pre-processing device 7, a digital filter may be used. By varying the filter coefficient of the digital filter, the frequency component pass characteristic may be controlled for converting the resolution or the number of pixels in the horizontal direction may be thinned out for converting the number of pixels.

Figure 3B:
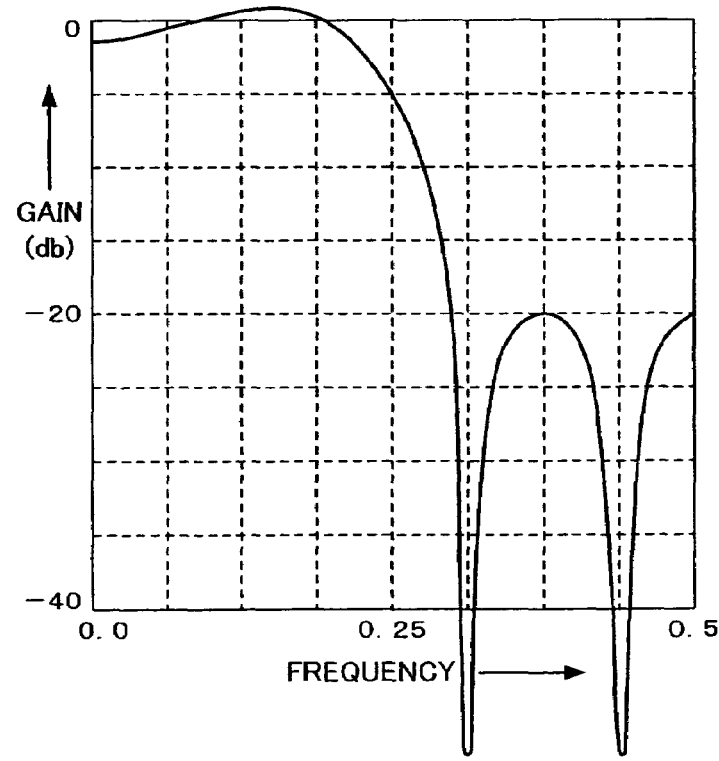

FIGS. 3A and 3B shows two examples of a frequency characteristic of the filter calculating device 10. The filter calculating device 10 is a pre-filter that limits the frequency band of a digital picture signal. In FIGS. 3A and 3B, the frequency axis (horizontal axis) represents a frequency normalized with the Nyquist frequency. The frequency characteristic shown in FIG. 3A has a wider frequency pass band than that shown in FIG. 3B.

Figure 4A:
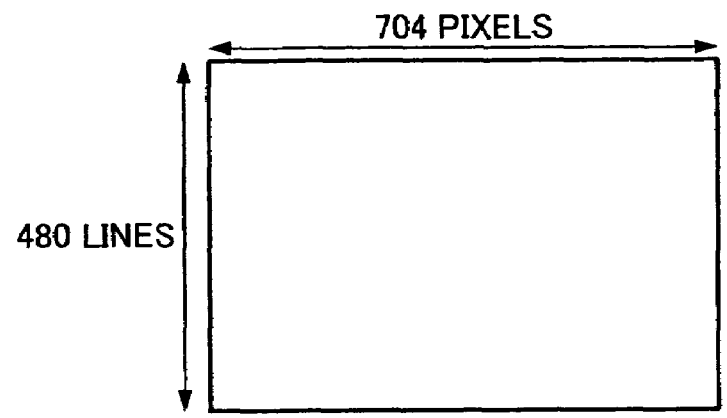
FIGS. 4A, 4B, and 4C are schematic diagrams showing examples of the sizes of regular pictures according to the embodiment of the present invention.
Figure 4B:
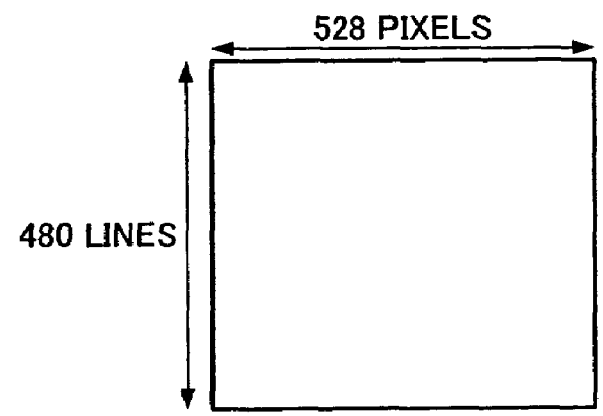
Figure 4C:
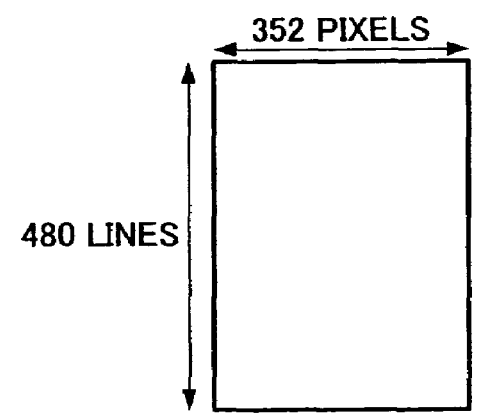

An output signal of the filter calculating device 10 is supplied to the thin-out processing device 11. The thin-out processing device 11 thins out pixels in the horizontal direction and the vertical direction and generates a regular size picture. The pre-processed picture signal is supplied to the moving vector detecting device 8 and the encoding device 9. FIG. 4A shows a picture having a size of which (the number of pixels in the horizontal direction×the number of lines in the vertical direction) is (704×408), respectively. FIG. 4B is a picture having a size of which the number of pixels in the horizontal direction is reduced to ⅔ of that of the picture shown in FIG. 4A. FIG. 4C is a picture having a size of which the number of pixels in the horizontal direction is reduced to ½ of that of the picture shown in FIG. 4A. These three types of pictures can be treated as regular size pictures. The pre-processing device 7 outputs one of the three types of pictures. When a picture having the size shown in FIG. 4B is output from the pre-processing device 7, the filter characteristic shown in FIG. 3A is used. When a picture having the size shown in FIG. 4C is output from the pre-processing device 7, the filter characteristic shown in FIG. 3B is used.

The moving vector detecting device 8 is composed of a frame memory 12 and a motion detector 13. The frame memory 12 stores a picture to be encoded. The motion detector 13 detects a moving vector between two adjacent frames in the forward direction and the backward direction. The frame memory 12 has a storage capacity for storing picture data of a plurality of frames. The frame memory 12 stores data for thumbnail pictures at a different memory area from a dedicated memory area for picture data for compressing regular moving pictures (see FIGS. 4A, 4B, and 4C). In other words, the frame memory 12 has an area for temporally storing picture data that has not been compressed and an area for temporally storing thumbnail pictures (that will be described later).

The moving vector detecting device 8 obtains a moving amount of each pair of macro blocks between two adjacent frames in the forward direction and the backward direction in the time sequence.

In a moving picture compressing system mainly represented by the MPEG (Moving Picture Experts Group) standard, depending on motion predicting directions between two adjacent frames for obtaining a moving vector, as frames that are inter-frame encoded, there are a P picture (Predictive-coded picture) predicted only in the forward direction and a B picture (Bidirectionally predictive-coded picture) predicted both in the forward direction and the backward direction. In addition, a frame that is intra-frame encoded is an I picture (Intra-coded picture). In a B picture, as predictive pictures (reference pictures for obtaining a difference with the current B picture), three types of reference pictures are used. The first type reference picture is an I picture or a P picture that has been decoded and that is chronologically followed by the current B picture. The second type reference picture is an I picture or a P picture that has been decoded and that is chronologically preceded by the current B picture. The third type reference picture is an interpolated picture of the first type reference picture and the second type reference picture. The difference between the current B picture and each of the three type reference pictures that have been motion-compensated is encoded for each macro block.

Thus, there are a frame intra-coded macro block, a forward inter-frame predictive macro block (a future macro block is predicted with a past macro block), a backward inter-frame predictive macro block (a past macro block is predicted with a future macro block), and a bidirectional macro block (a current macro block is predicted both with a future macro block and a past macro block). All macro blocks in an I picture are intra-frame coded macro blocks. A P picture contains intra-frame coded macro blocks and forward inter-frame predictive macro blocks. A B picture contains the above-described four types of macro blocks.

Figure 5:
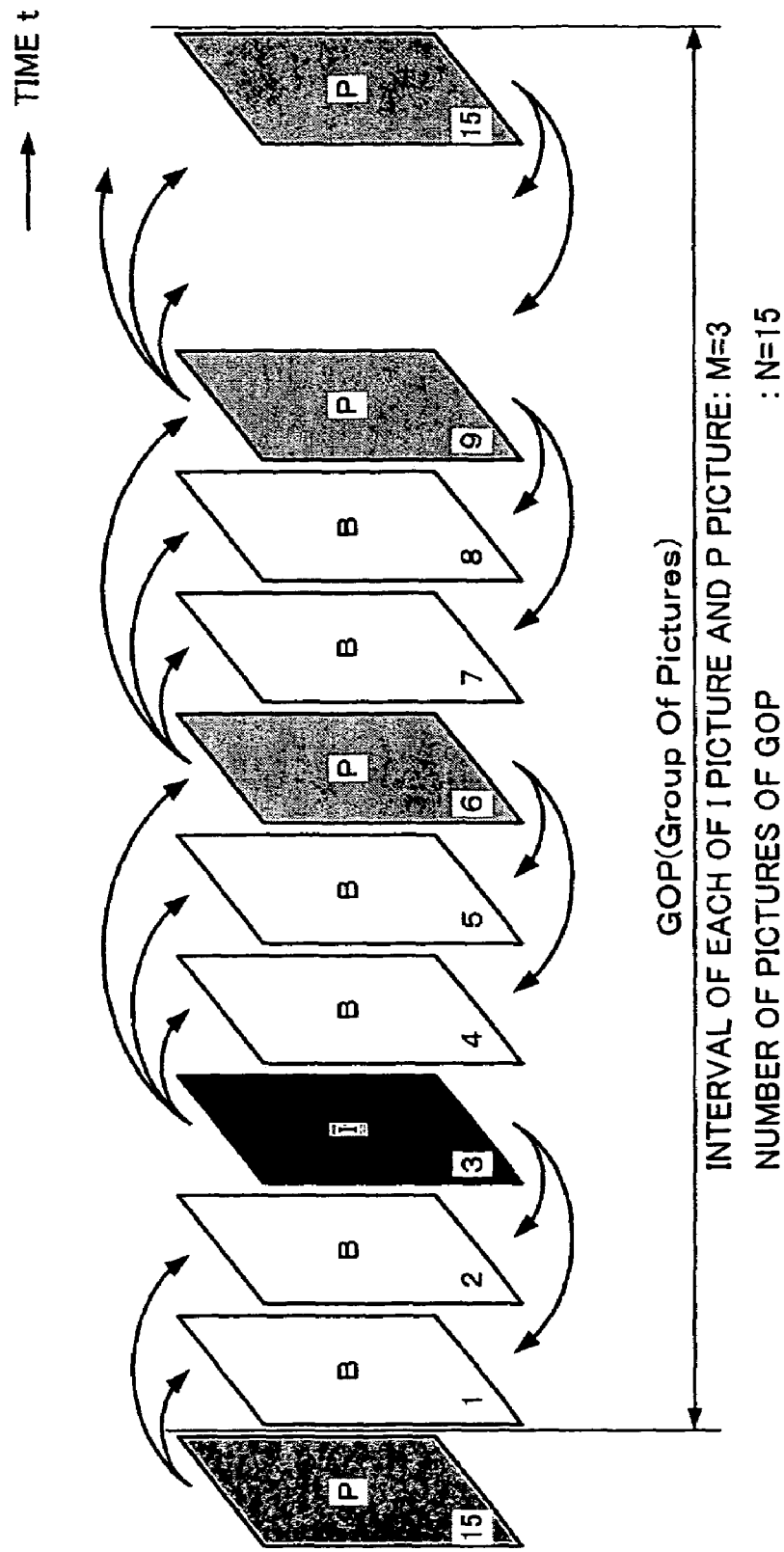
FIG. 5 is a schematic diagram for explaining an example of a compression encoding process according to the embodiment of the present invention.

In the MPEG standard, a GOP (Group Of Pictures) structure that is a group of pictures is defined so that data can be randomly accessed. In the MPEG standard, a GOP is defined as follows. The first picture of the GOP is an I picture. The last picture of the GOP is an I picture or a P picture. A GOP that is predicted with the last I or P picture of the preceding GOP is permitted. FIG. 5 shows an example of a GOP of which M=3 and N=15 (where the interval of each of an I picture and a P picture is M; and the number of picture of a GOP is N).

The encoding device 9 performs such an MPEG encoding process. The encoding device 9 outputs a bit stream of a compressed picture signal through a discrete cosine transform (DCT) device 14, a quantizing device 15, and a variable length encoding device 16. In addition, an output signal of the quantizing device 15 is supplied to an inversely quantizing device 17 and an inverse DCT device 18 so as to decode the picture data. An output signal of the inverse DCT device 18 is supplied to an adding device 19. The adding device 19 adds the decoded picture data and picture data of a restructured reference frame. An output signal of the adding device 19 is stored to a frame memory 20.

A motion compensating device 21 compensates the motion of the picture data stored in the frame memory 20 using a moving vector obtained from the moving vector detecting device 8. When restructured picture data is inter-frame encoded, a subtracting device 22 subtracts the output data of the motion compensating device 21 from the output picture data of the pre-processing device 7. In that case, a switch 23 is placed at a position a. On the other hand, when the restructured picture data is intra-frame encoded, the switch 23 is placed in a position b. A bit stream that is output from the variable length encoding device 16 is output to the writing device 4 shown in FIG. 1 through a buffer 24. A quantization controlling device 25 controls the quantizing parameter of the quantizing device 15 so as to control the bit rate. At that point, the quantization controlling device 25 monitors the buffer amount of the buffer 24 corresponding to a quantizing command received from the compression controlling device 6 shown in FIG. 1.

The encoding device 9 compensates the motion of picture data using the moving vector value obtained by the moving vector detecting device 8, decreases the redundancy of the data in the chronological direction, transforms data from the space axis direction to the frequency axis direction corresponding to the DCT method, and quantizes less redundant data weighted on the frequency axis. Thereafter, the encoding device 9 encodes the quantized data with variable length code and finally obtains a bit stream.

In such a manner, the compression encoding process is performed for a regular size moving picture sequence. However, according to the embodiment of the present invention, while the above-described MPEG compression encoding process is being performed, a thumbnail picture generating process is performed. A generated thumbnail picture is stored in a frame memory. For example, after a picture is photographed, a generated thumbnail picture is read as a moving picture sequence. The thumbnail moving picture sequence is compression-encoded and recorded to the record medium 5. In this case, as with a regular size picture, the MPEG compression encoding process can be used for a thumbnail picture.

Figure 6:
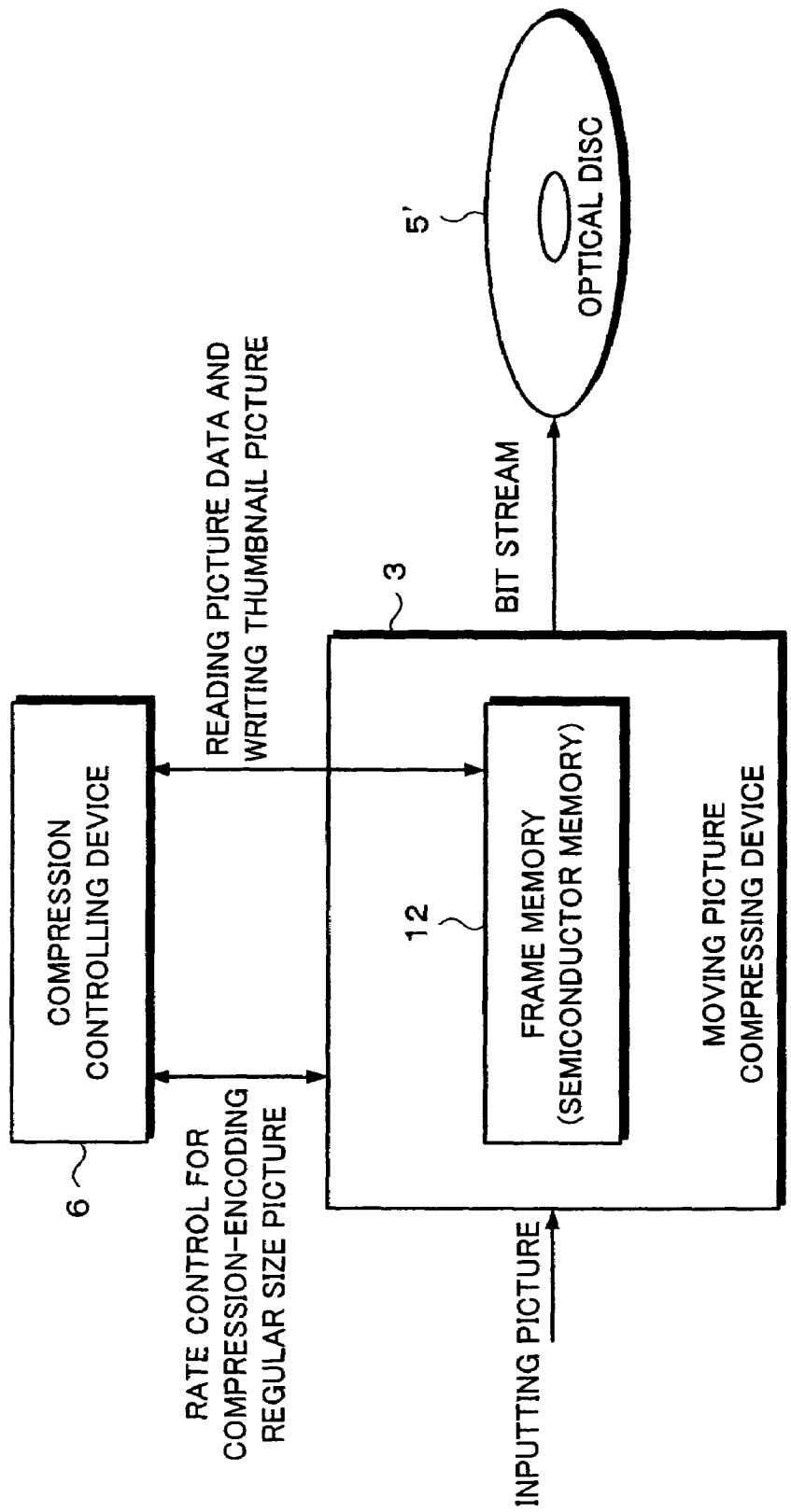
FIG. 6 is a block diagram showing an outlined structure of the embodiment of the present invention.

Next, with reference to FIG. 6, the operation of the embodiment will be described in brief. A photographed moving picture sequence is compression-encoded in a regular picture size by the moving picture compressing device 3. The compression-encoded result is successively written to for example an optical disc 5'. While the basic operation is being performed, the compression controlling device 6 reads a relevant frame picture from the frame memory 12 (for example, a semiconductor memory) of the moving vector detecting device 8, generates a thumbnail picture of the frame picture, and writes the generated thumbnail picture to a dedicated thumbnail picture area of the frame memory 12. The compression controlling device 6 repeats this operation.

Next, the operation of the thumbnail picture generating process performed along with the conventional compression-encoding process will be described. It is assumed that one frame of the input picture signal is composed of 704 pixels in the horizontal direction×480 lines in the vertical direction as shown in FIG. 4A. One macro block is composed of 16 pixels in the horizontal direction and 16 lines in the vertical direction. Thus, one frame is composed of 44 macro blocks in the horizontal direction×30 macro blocks in the vertical direction. In addition, it is assumed that the number of frames of the input moving picture sequence per second is 30.

In the process performed by the pre-processing device 7 shown in FIG. 2, as regular size picture data to be compression-encoded and written to the frame memory 12 of the moving vector detecting device 8, there are three types of sizes that are the regular size that is not thinned out in the horizontal direction (see FIG. 4A), the ¾ size reduced in the horizontal direction (see FIG. 4B), and the ½ size reduced in the horizontal direction (see FIG. 4C).

A thumbnail picture generated corresponding to each of those regular size pictures is composed of 176 pixels in the horizontal direction×120 lines in the vertical direction. The size of each thumbnail picture is equivalent to the size of which an original input picture is reduced to ¼ in each of the horizontal direction and the vertical direction. When a thumbnail picture of a regular size picture shown in FIG. 4A is generated, one pixel is sampled every four pixels in the horizontal direction, whereas one line is sampled every four lines in the vertical direction. When a thumbnail picture of a regular size picture shown in FIG. 4B is generated, one pixel is sampled every three pixels in the horizontal direction, whereas one line is sampled every four lines in the vertical direction. When a thumbnail picture of a regular size picture shown in FIG. 4C is generated, one pixel is sampled every two pixels in the horizontal direction, whereas one line is sampled very four lines in the vertical direction.

Figure 8:
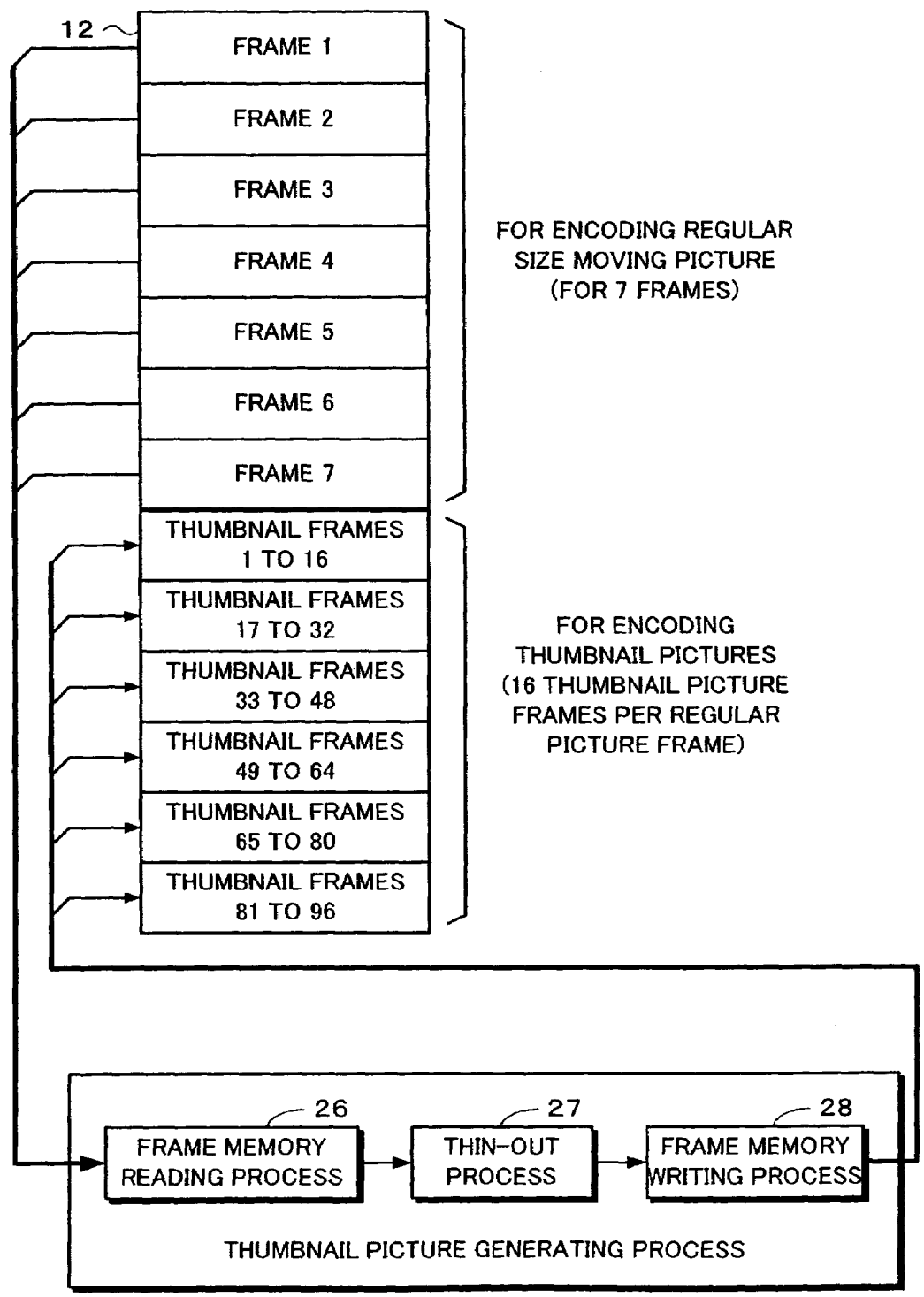
FIG. 8 is a block diagram for explaining a thumbnail picture generating process according to the embodiment of the present invention.

As shown in FIG. 8, such a thumbnail picture is generated by accessing the frame memory 12 of the moving vector detecting device 8. This operation is performed by the compression controlling device 6 shown in FIG. 1. FIG. 8 shows the structure of a portion that performs the thumbnail picture generating process of the compression controlling device 6. This portion is composed of a frame memory read processing portion 26, a thin-out processing portion 27, and a frame memory write processing portion 28.

While a moving picture is being photographed, the moving picture is successively input and stored as a regular size picture to be compression-encoded to a regular picture area of the frame memory 12. The regular picture area has a storage space for seven frames. In other words, while a moving picture is being photographed, each frame of the moving picture is successively and cyclically written to the regular picture area. Each frame picture stored in the regular picture area is compression-encoded.

To generate thumbnail pictures, the frame memory read processing portion 26 extracts one frame from the regular size picture sequence at predetermined frame intervals. A frame picture that is extracted from the regular size picture sequence is supplied to the thin-out processing portion 27. The thin-out processing portion 27 performs required horizontal and vertical thin-out processes and generate a thumbnail picture. Thumbnail pictures are successively written to a thumbnail picture memory area of the frame memory 12 by the frame memory write processing portion 28.

Figure 7A:
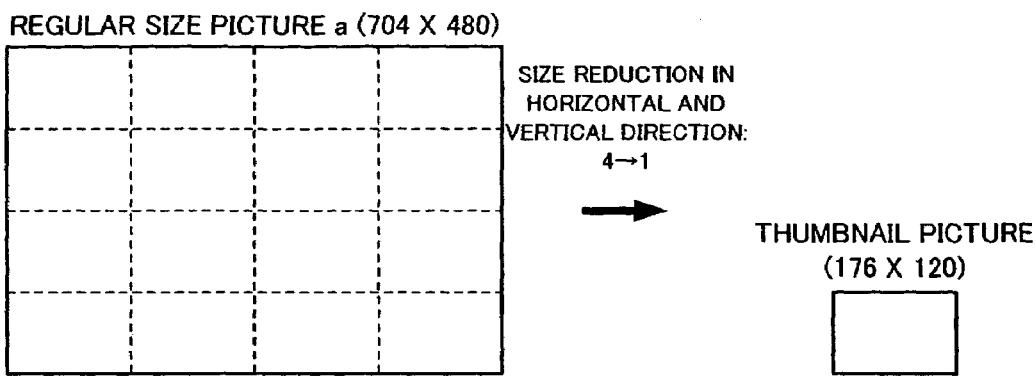
FIGS. 7A, 7B, and 7C are schematic diagrams for explaining the sizes of thumbnail pictures according to the embodiment of the present invention.
Figure 7B:
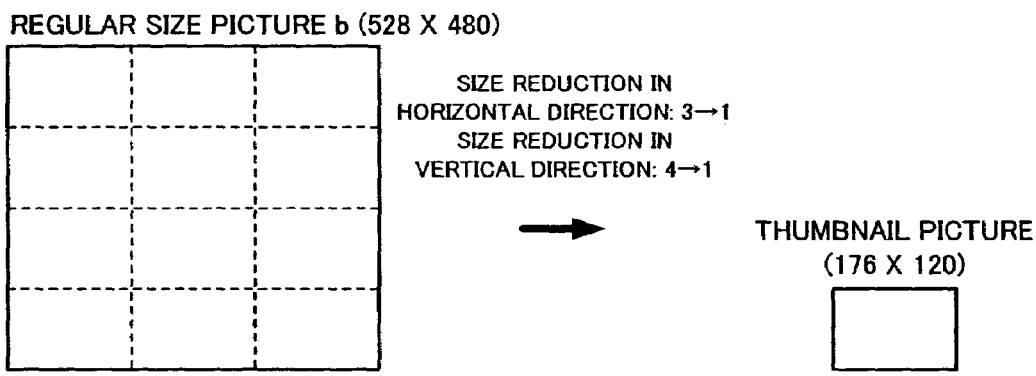
Figure 7C:
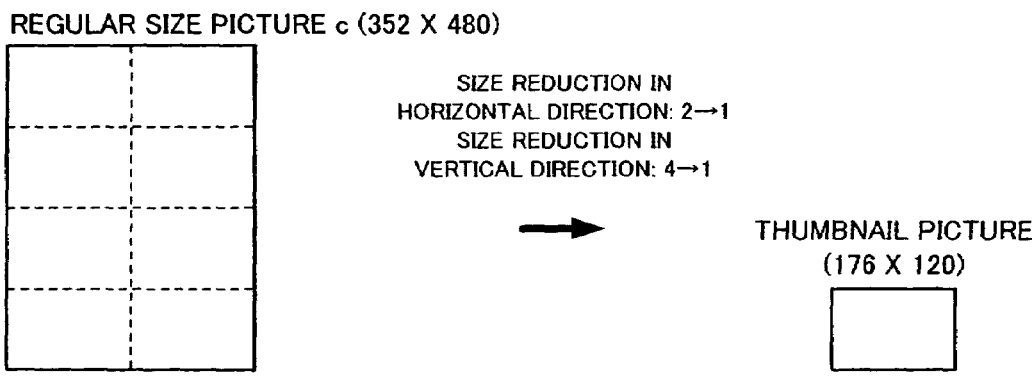
Figure 9:
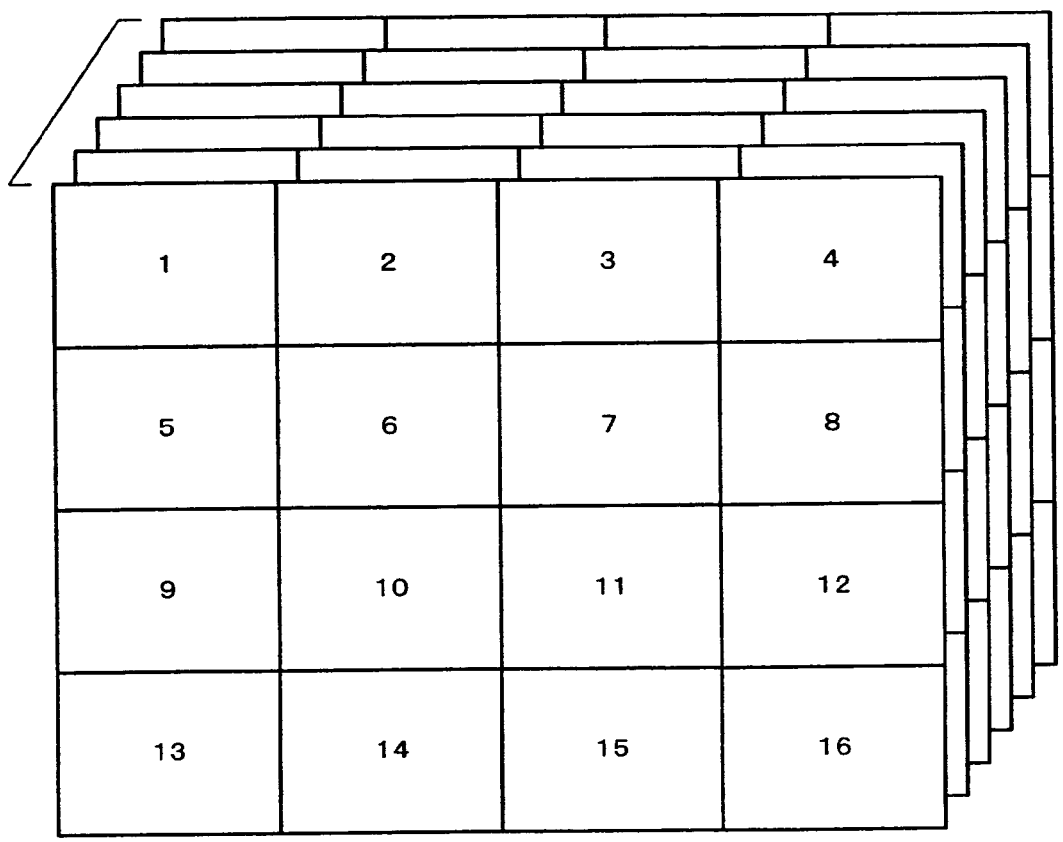
FIG. 9 is a schematic diagram for explaining a frame arrangement of thumbnail pictures on a memory according to the embodiment of the present invention.

FIG. 8 shows an example of which an area for six frames of regular size pictures is used for the thumbnail picture area of the frame memory 12. As shown in FIG. 7A, the size of each thumbnail picture is ¼ of the size of each regular size picture in each of the horizontal direction and the vertical direction. Thus, four thumbnail pictures can be written in each of the horizontal direction and the vertical direction. In other words, a total of 16 thumbnail pictures can be written to one frame area of the regular picture area. Thus, as shown in FIG. 9, in the thumbnail picture area for six frames of the frame memory 12, a total of 96 thumbnail pictures can be stored.

Next, the thumbnail picture generating operation of the compression controlling device 6 shown in FIG. 1 will be described. In this example, the maximum number of frames written to the thumbnail picture area of the frame memory is 96. At this point, characteristics of thumbnail pictures depend on how frames are extracted from the input picture.

Figure 10:
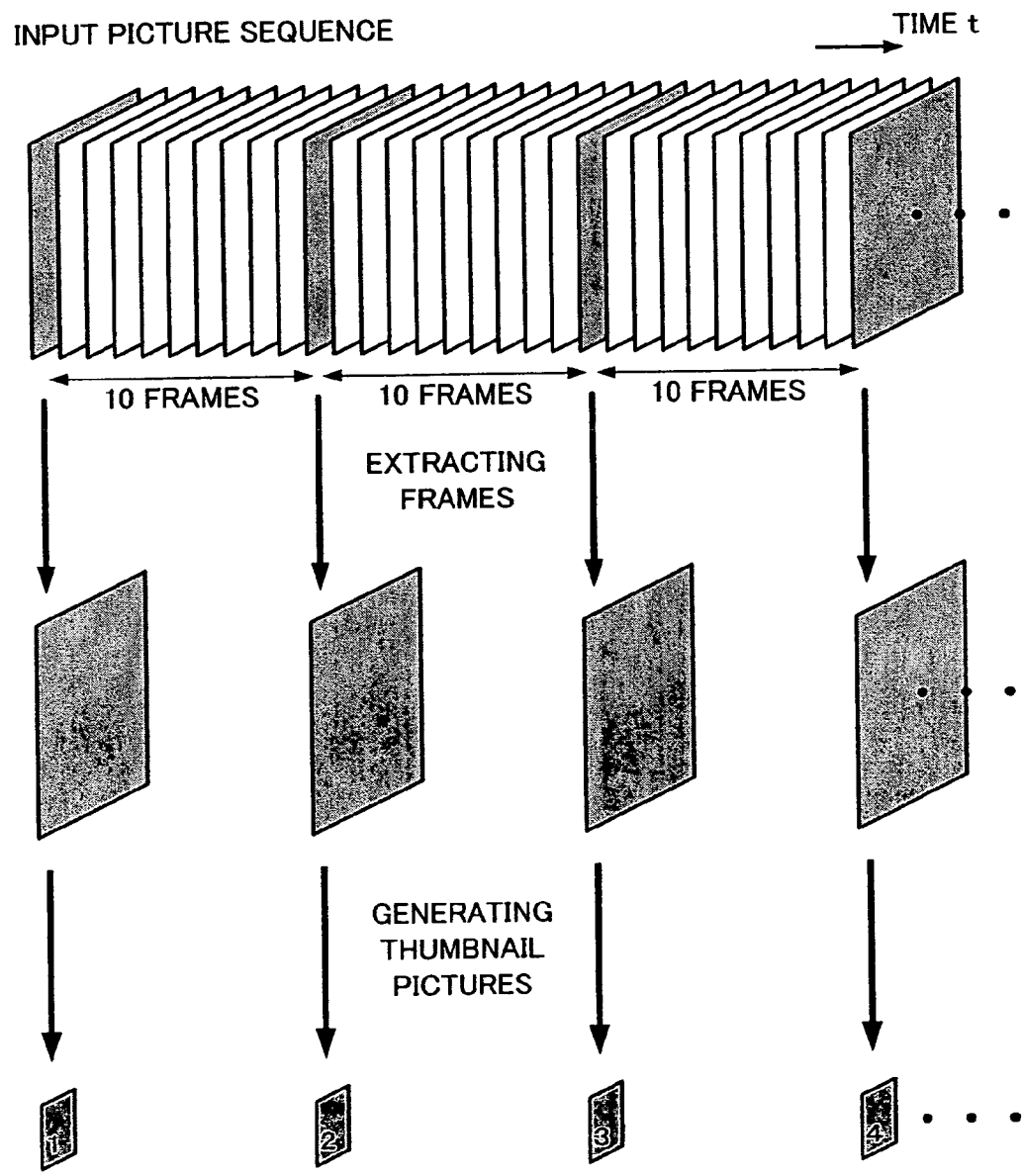
FIG. 10 is a schematic diagram for explaining a frame interval of generated thumbnail pictures according to the embodiment of the present invention.

For example, as shown in FIG. 10, frames for thumbnail pictures are extracted from frames of the input picture at predetermined intervals. This method is the simplest method. In FIG. 10, one frame is extracted every 10 frames. With the extracted frame, a thumbnail picture is generated. Thus, three frame pictures are extracted from 30 frames of one second. In such an example, the compression controlling device 6 shown in FIG. 1 accesses regular size picture data of the frame memory 12 at intervals of 10 frames, generate thumbnail pictures, and successively stores the generated thumbnail pictures to the frame memory 12.

While a moving picture is being photographed, a bit stream that has been compression-encoded is recorded to a record medium such as the optical disc 5' on real time basis. After the moving picture is photographed, the generated thumbnail pictures are read from the thumbnail picture area of the frame memory 12. As a result, the content of the photographed moving picture can be browsed with the thumbnail picture sequence. For example, by reading a regular size picture frame (namely, a 16-thumbnail picture frame), the content can be browsed. In this case, as shown in FIG. 9, 16 thumbnail pictures are displayed as one still picture.

According to the embodiment of the present invention, instead of still thumbnail pictures, a moving thumbnail picture sequence is generated. In other words, each thumbnail picture stored in the frame memory 12 is output at intervals as extracted from the input picture sequence so as to generate a thumbnail moving picture sequence. In addition, by compression-encoding the thumbnail picture sequence, a bit stream thereof is generated and recorded to the record medium. However, to synchronize with the photographed picture sequence, the bit steam is compression-encoded so that one thumbnail picture is repeated for 10 frames equivalent to the frame interval.

Figure 11:
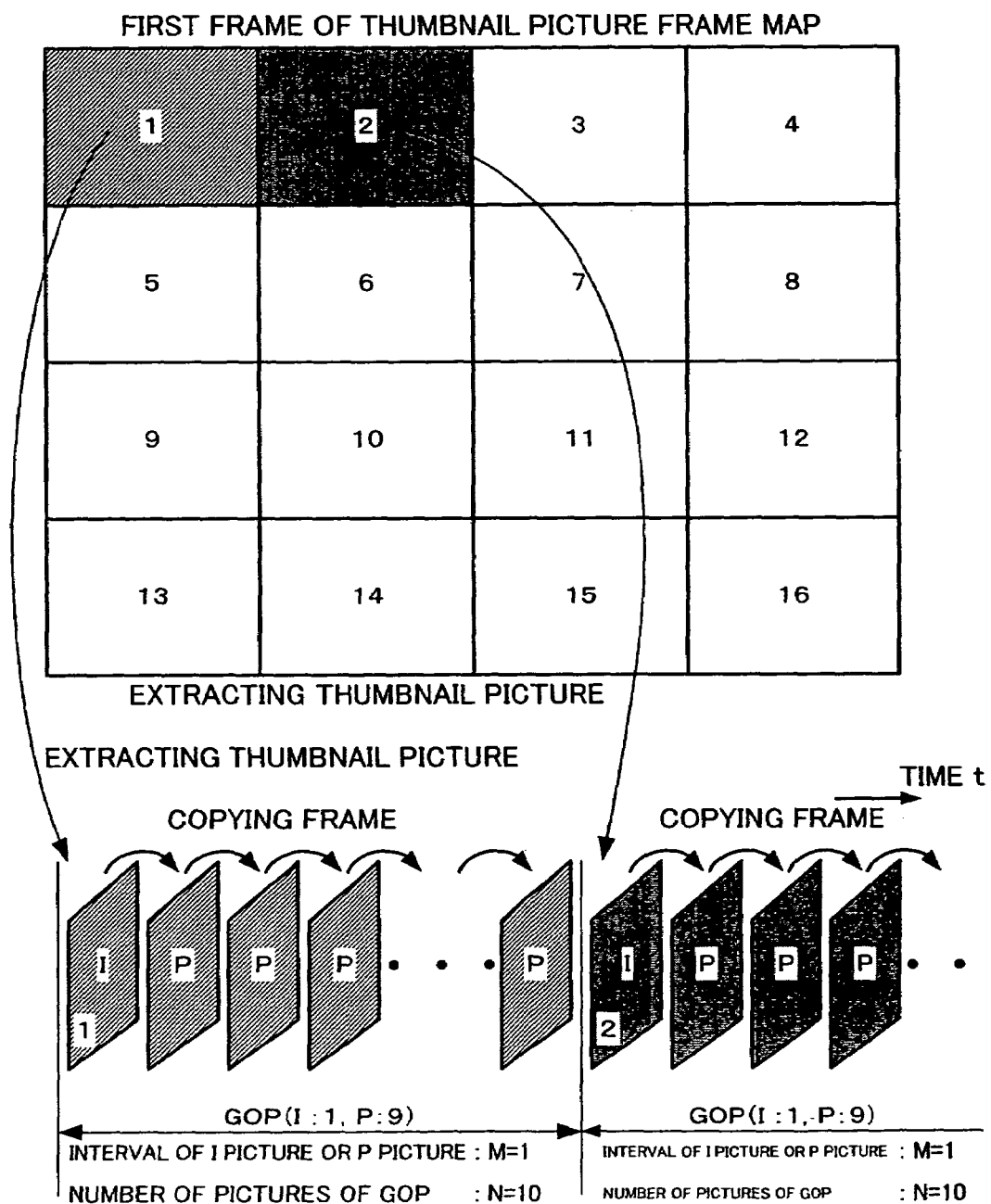
FIG. 11 is a schematic diagram for explaining the structure of a thumbnail moving picture sequence according to the embodiment of the present invention.

When the bit stream is compression-encoded, one thumbnail picture can be encoded as an I picture for ten frames. However, in that case, the code amount adversely increases. Thus, as shown in FIG. 11, when one frame is extracted every 10 frames and a thumbnail picture is generated, one frame of a thumbnail picture is compression-encoded as an I picture. Each of the remaining nine frames is encoded as a P picture of which the value of the moving vector of all the macro blocks is 0 and the difference value of the forward prediction due to the moving vectors of all the macro blocks is 0. Thus, each of the pictures of the nine frames becomes the same as the picture of the preceding frame processed as an I picture. In other words, since one type of a frame is intentionally copied, the code amount can be minimized. In that case, a bit stream of which the interval of an I picture or a P picture is (M=1) and the number of pictures of one GOP is (N=10) is generated.

A moving thumbnail picture stream generated in such a manner is recorded to the record medium 5 or another record medium. In that example, by decreasing the frame rate (the number of frames per second) against regular size pictures, a smooth motion can be accomplished. Thus, a moving thumbnail picture sequence can be generated.

As was described above, when a moving thumbnail picture sequence is generated with input pictures extracted at predetermined intervals (of 10 frames), the moving thumbnail picture sequence is irrespective of characteristics of the photographed moving picture sequence. Thus, in that case, redundant thumbnail pictures may be successively generated depending on characteristics of an input moving picture sequence. As a typical example of such a case, when thumbnail pictures are generated at predetermined intervals with a moving picture that does not almost move, frames of thumbnail pictures do not almost move may be successively generated.

To solve such a problem, according to the embodiment of the present invention, in addition to generating thumbnail pictures at predetermined intervals, a method for effectively generating a moving thumbnail picture sequence is used. The method is accomplished by detecting a change of an input picture sequence. In this method, the compression controlling device 6 always measures and analyzes a moving vector and an intra-block difference value that has been motion-compensated. Thus, the feature of a photographed moving picture sequence is always observed. With the observed result, a frame picture is extracted at a proper interval corresponding to a change of the photographed input picture sequence. With the extracted picture, a thumbnail picture is generated and stored to the frame memory 12. At that point, although thumbnail pictures are generated at irregular intervals, when a moving picture sequence is photographed, thumbnail pictures can be effectively generated.

In reality, corresponding to the content of an input moving picture sequence (namely, corresponding to an object contained in a moving picture sequence that is compression-encoded moves largely or stops), thumbnail pictures are generated. Examples of the change of the moving picture sequence include a rapid panning operation of a camera, a zoo-in picture, and a zoom-out picture. When a change of an input moving picture sequence is detected, one thumbnail picture is generated. When a large change of an input moving picture sequence takes place, the compression controlling device 6 shown in FIG. 1 detects it corresponding to various feature amounts and generates thumbnail picture.

Next, a process for generating thumbnail pictures at predetermined intervals and generating a moving thumbnail picture sequence corresponding to a change of an input moving picture sequence will be described. In the process, a moving thumbnail picture sequence can be effectively generated corresponding to a change of an input moving picture sequence.

Figure 12:
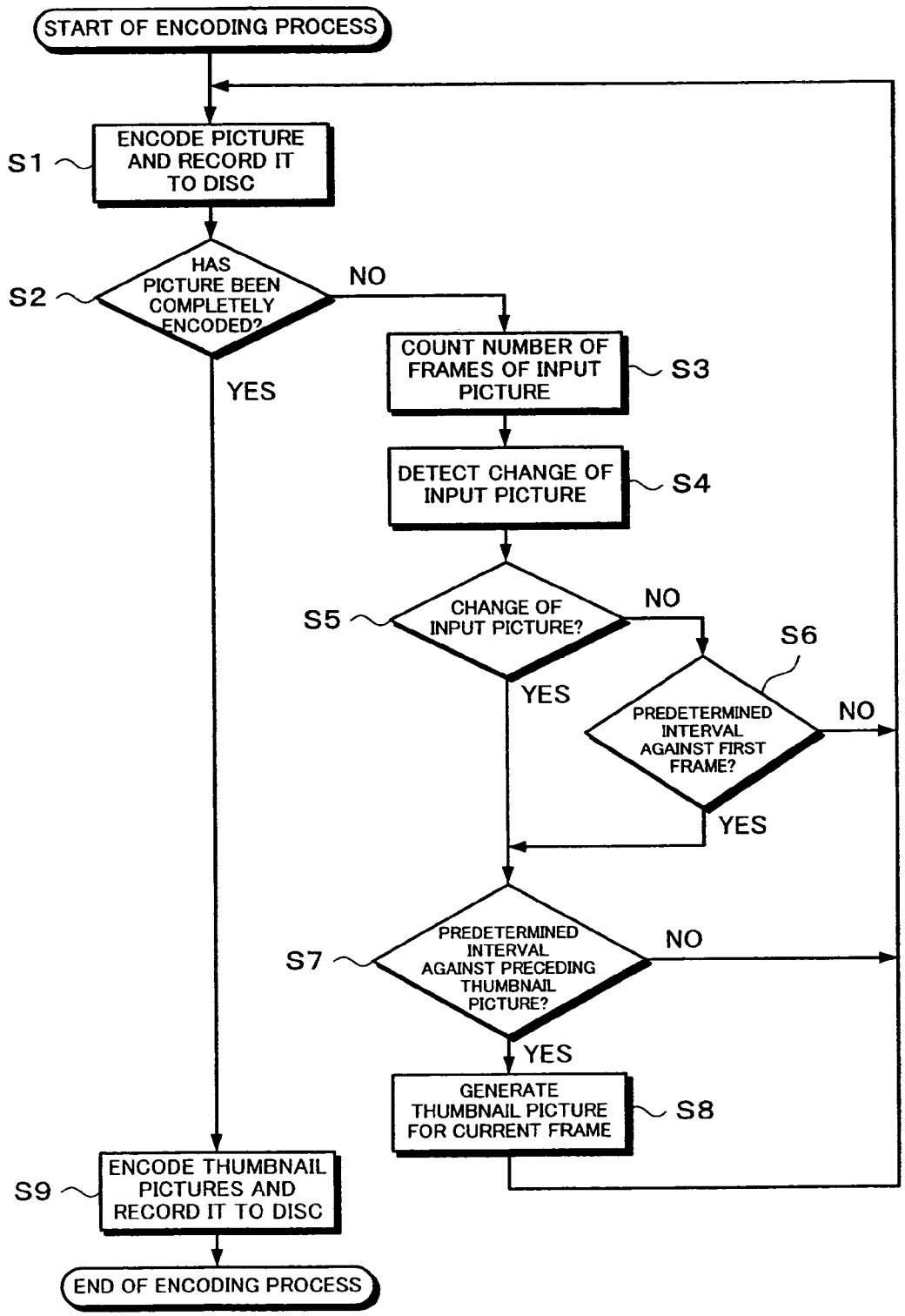
FIG. 12 is a flow chart for explaining the thumbnail picture generating process according to the embodiment of the present invention.

FIG. 12 is a flow chart showing the operation of the compression controlling device 6. When a moving picture sequence is photographed (namely, a compression-encoding process is started), a regular size moving picture sequence is encoded at step S1. A bit stream of the compression-encoded regular size picture sequence is recorded to a record medium such as an optical disc. Until the conventional compression-encoding process is completed, a thumbnail picture generating process is performed. At step S2, the compression controlling device 6 determines whether or not the conventional encoding process has been completed. When the determined result at step S2 is No (namely, the conventional encoding process has not been completed), the compression controlling device 6 counts the number of frames of the input moving picture sequence at step S3. Thereafter, the compression controlling device 6 detects a change of the input moving picture sequence corresponding to the method that will be described later at step S4.

Thereafter, the compression controlling device 6 determines whether or not a change of the input moving picture sequence has been detected corresponding to the change detecting process at step S5. When the determined result at step S5 is No (namely, a change of the input moving picture sequence has not been detected), the compression controlling device 6 determines whether or not the current frame has a predetermined interval against the first frame at step S6. When the determined result at step S6 is No (namely, the current frame does not have the predetermined interval against the first frame), the compression controlling device 6 causes the flow to return to step S1. On the other hand, when the determined result at step S6 is Yes (namely, the current frame has the predetermined interval against the first frame), the compression controlling device 6 designates the current frame as an alternative of a thumbnail picture. Thereafter, the compression controlling device 6 determines whether or not the alternative has a predetermined interval against the preceding thumbnail picture (this interval is referred to as minimum thumbnail picture generation frame interval) at step S7. When the determined result at step S7 is No, the compression controlling device 6 causes the flow to return to step S1.

When the determined result at step S7 is Yes (namely, a change of the input moving picture sequence has been detected or the current frame has the predetermined interval against the first frame and the current frame has the predetermined interval against the preceding thumbnail picture), the compression controlling device 6 generates a thumbnail picture for the current frame at step S8.

When the determined result at step S2 is Yes (namely, the input moving picture sequence has been completely photographed and the encoding process for the regular size moving picture sequence has been completed), the compression controlling device 6 reads thumbnail pictures from the thumbnail picture area of the frame memory 12, encodes them as one thumbnail moving picture sequence, and records the resultant bit stream to the record medium such as an optical disc. After the bit stream has been completely recorded to the record medium, the compression controlling device 6 completes the operation.

Figure 13:
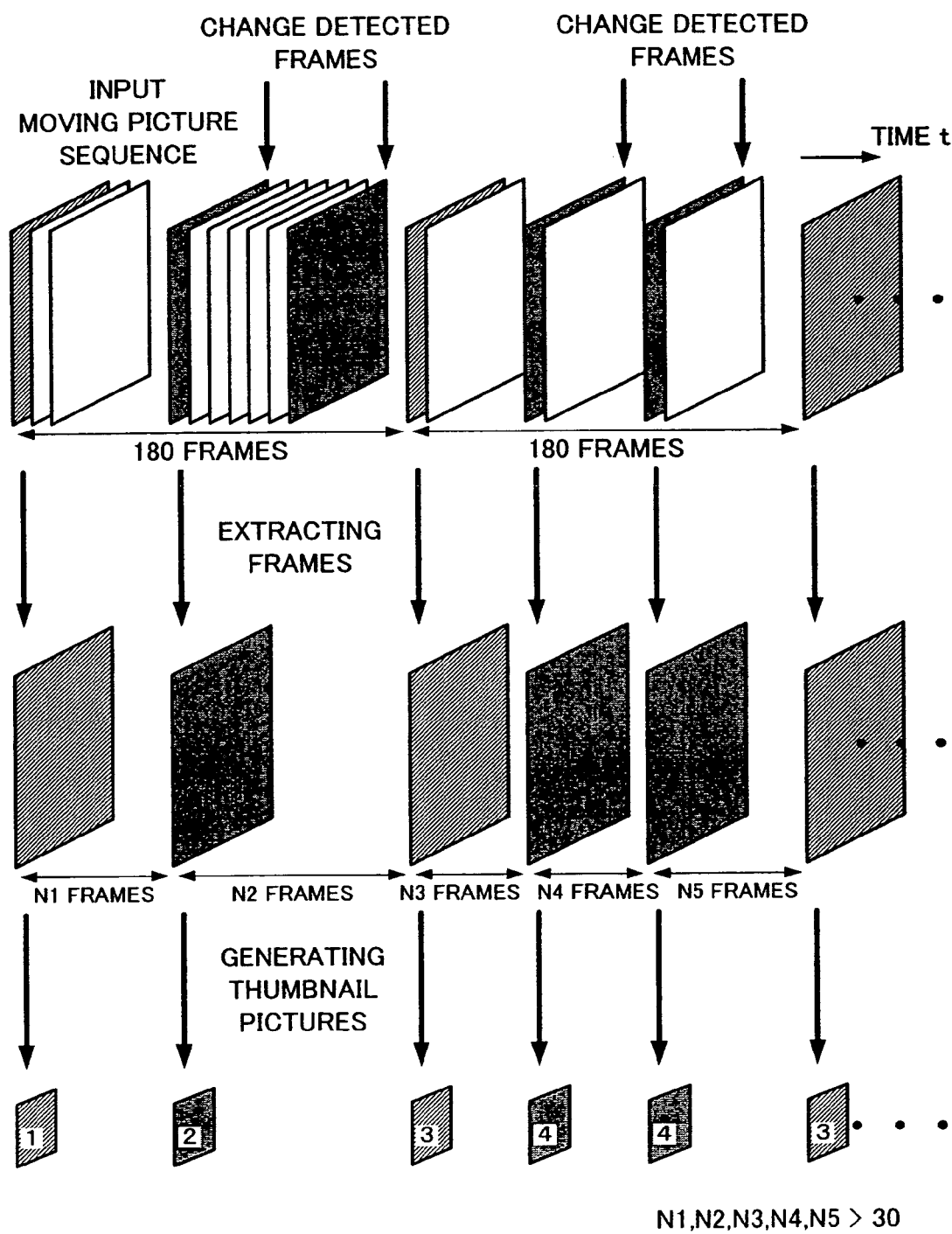
FIG. 13 is a schematic diagram for explaining the thumbnail picture generating process for detecting a change of an input picture sequence according to the embodiment of the present invention.

When a moving thumbnail picture sequence is generated corresponding to a change of an input moving picture sequence, the relation shown in FIG. 13 is satisfied. In other words, according to the embodiment, thumbnail picture generation frame intervals (including the first frame) are designated to 180 frames. In addition, a thumbnail picture is generated corresponding to a change of the input moving picture sequence. Moreover, the minimum thumbnail picture generation frame interval is designated to 30 frames. In FIG. 13, frame intervals of which pictures are extracted are denoted by N1, N2, N3, . . . each of which is larger than 30.

Figure 14:
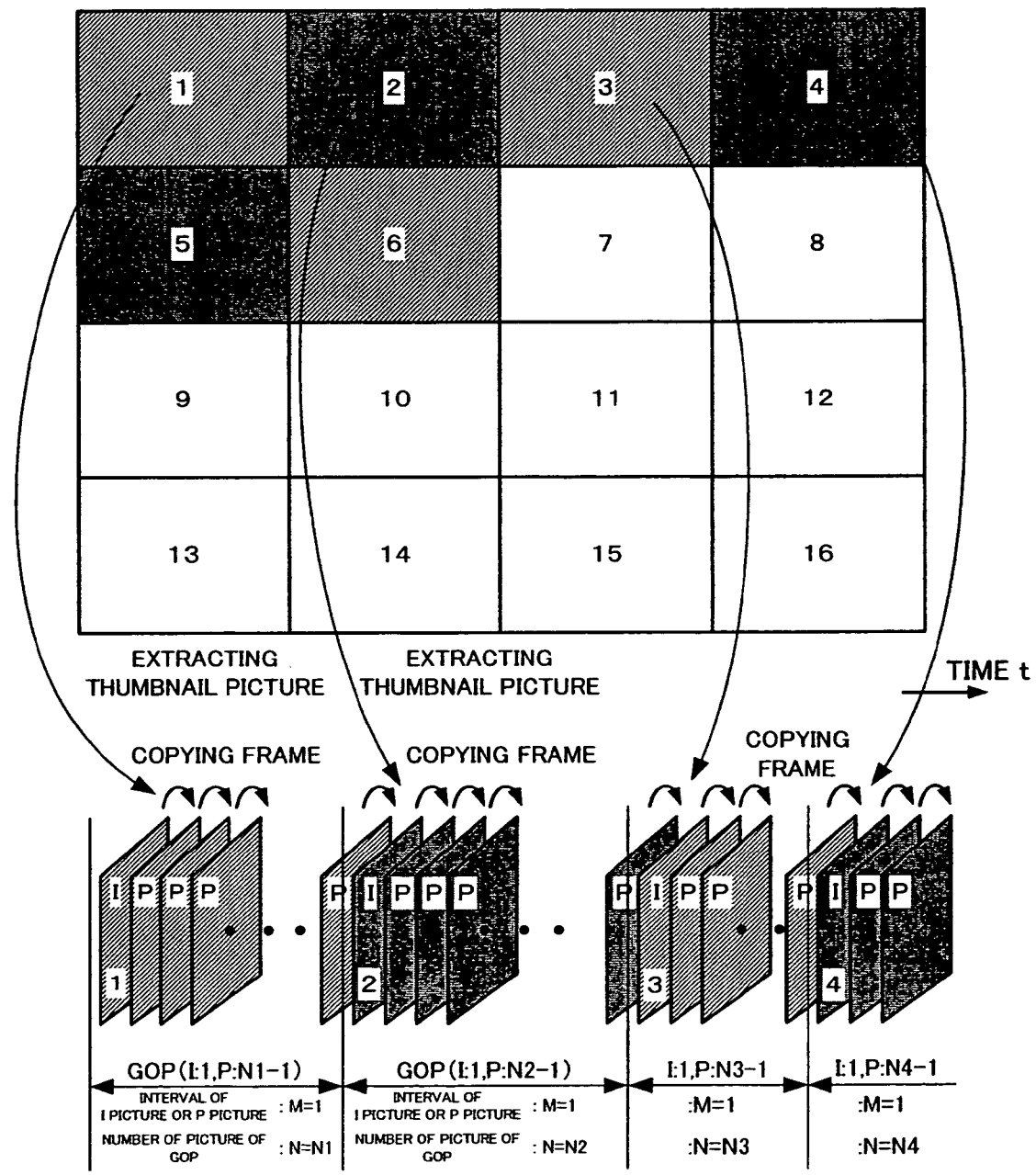
FIG. 14 is a schematic diagram for explaining the structure of a moving picture sequence according to the embodiment of the present invention.

When a bit steam of which a moving thumbnail picture sequence shown in FIG. 13 has been extracted at predetermined frame intervals, compression-encoded and recorded to a record medium is expansion-decoded, the bit stream is represented as a moving picture sequence shown in FIG. 14. In FIG. 13, the interval of I or P picture is (M=1). On the other hand, the number of pictures of each GOP varies as N1, N2, N3, . . .

Next, the input moving picture change detecting method at steps S4 and S5 shown in FIG. 12 will be described. According to the embodiment, the input moving picture change detecting function of the compressing device 3 is used. The determinations of steps S4 and S5 are performed by the compression controlling device 6. The compression controlling device 6 determines how a motion compensation block difference value that represents a motion of an input moving picture sequence in the entire screen or a motion compensation matching state varies while the input moving picture sequence is being encoded. When the compression controlling device 6 detects a large increase or a large decrease of the motion compensation block difference, the compression controlling device 6 determines that a large change takes place in the input moving picture sequence.

In the following description, as a block difference value that has been motion-compressed, an absolute sum of difference values of individual macro blocks that have been motion-compensated with moving vectors obtained for individual macro blocks of which a P picture of the GOP structure shown in FIG. 5 is divided into (16 pixels×16 lines) blocks in the vertical direction and the horizontal direction is used.

The block difference BD (k, l) of the macro block MB (k, l) at the k-th horizontal position and the l-th vertical position of one frame can be expressed as the following formula.

$$BD(k, l) = \Sigma\Sigma[dc(16 \times (k-1) + i, 16 \times (l-1) + j) - dt(16 \times (k-1) + i + mvx(k, l), 16 \times (l-1) + j + mvy(k, l))]$$

where mvx (k, l) is the horizontal moving vector value of the macro block MB (k, l); mvy (k, l) is the vertical moving vector value of the macro block MB (k, l); and $\Sigma\Sigma$ is a sum from j=1 to j=16 and a sum from i=1 to i=16.

Figure 15:
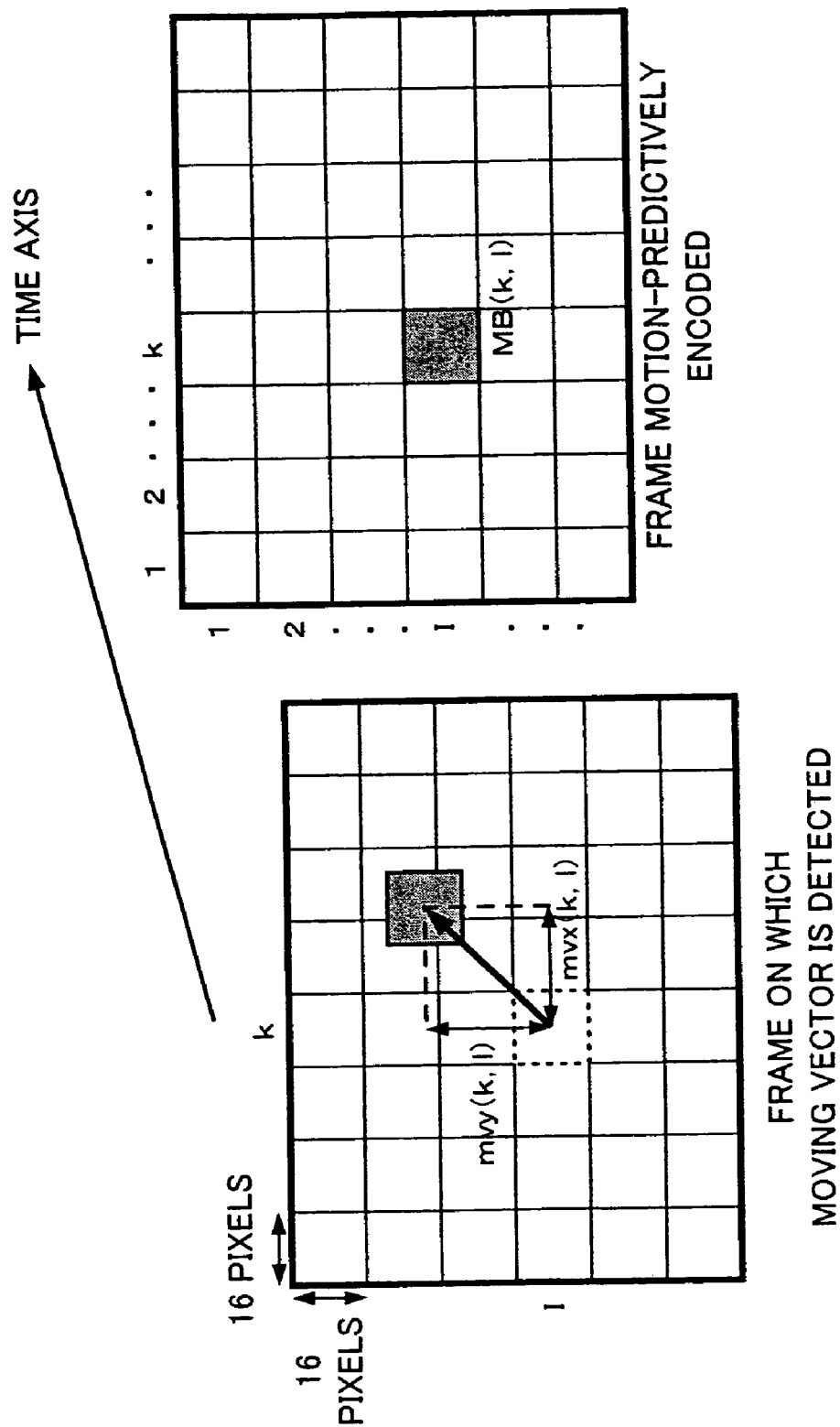
FIG. 15 is a schematic diagram showing the relation between a moving vector and a frame according to the embodiment of the present invention.

In this case, as shown in FIG. 15, the level value of the pixel at the horizontal coordinate position i and the vertical coordinate positon j in a frame on which a moving vector is detected is represented as dt (i, j). On the other hand, the level value of the same pixel in the frame that is motion-compensated is represented as dc (i, j).

In that case, the block difference value BD of the entire frame is the sum of BD (k, l) of the entire frame as expressed by the following formula.

$$BD = \Sigma\Sigma BD(k, l)$$

where $\Sigma\Sigma$ is a sum from l=1 to l=n/16 and a sum from k=1 to k=m/16; m is the number of pixels of one line; and n is the number of lines of one frame.

The block difference value BD of each picture is obtained. With a change width of the obtained block difference value BD, a change of an input moving picture sequence can be detected corresponding to a change width of each P picture.

Figure 16:
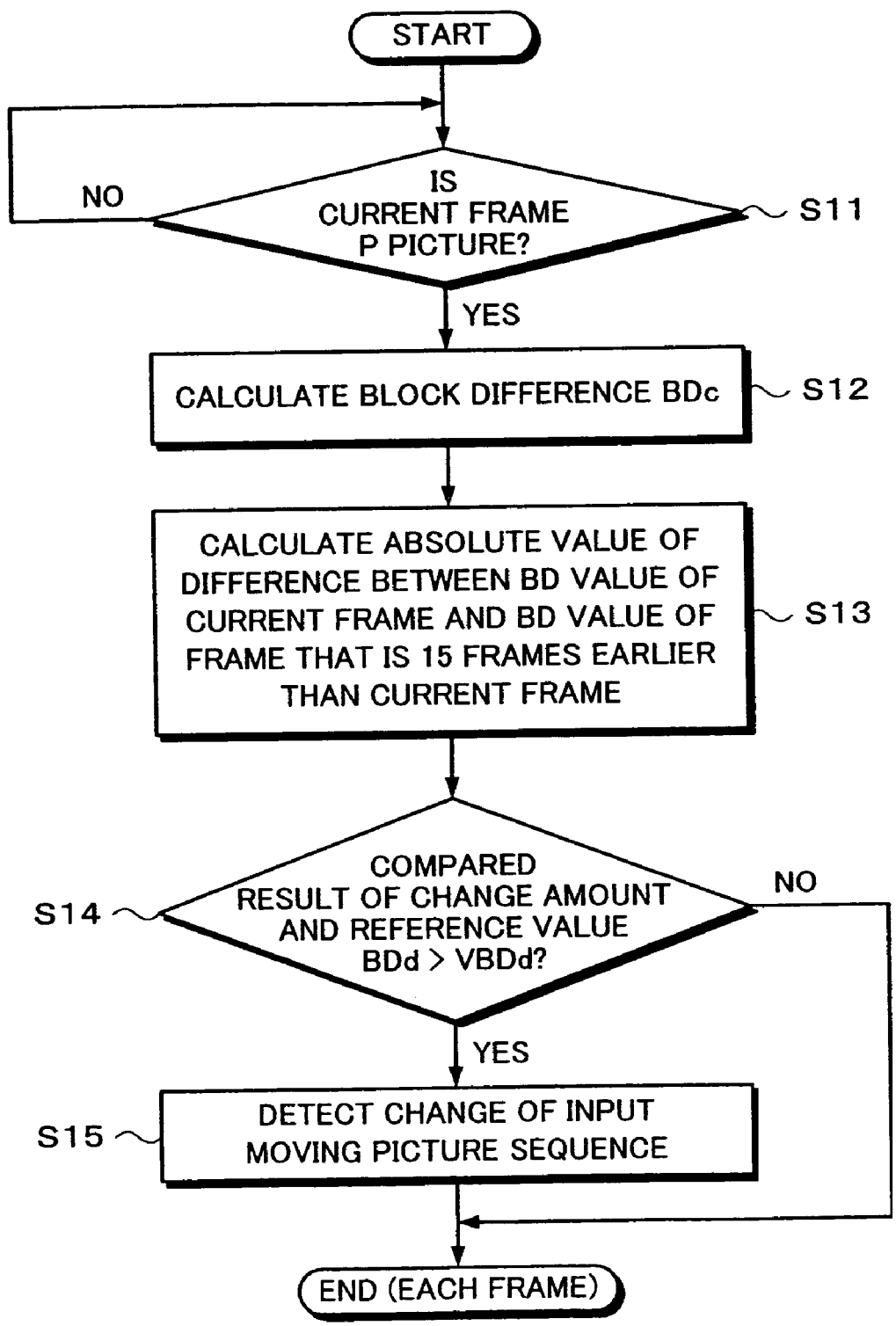
FIG. 16 is a flow chart showing a change detecting process of the input picture sequence according to the embodiment of the present invention.

FIG. 16 is a flow chart showing an example of a process for detecting an change of an input moving picture sequence according to the embodiment of the present invention. The process shown in FIG. 16 is equivalent to the input moving picture sequence change detecting step (at step S4) and the determining step (at step S5) shown in FIG. 12.

The compression controlling device 6 determines whether or not the current frame is a P picture of the GOP shown in FIG. 5 at step S11 shown in FIG. 16. When the determined result at step S11 is No (namely, the current frame is not a P picture), the compression controlling device 6 causes the flow to return to step S11. When the determined result at step S11 is Yes (namely, the current frame is a P picture), the compression controlling device 6 performs the above-described block difference calculation at step S12. Thus, the compression controlling device 6 obtains the block difference value BDc of the current frame.

Thereafter, the compression controlling device 6 calculates the absolute value of the difference between the block difference value BDc of the P picture of the current frame and the block difference value BDc of the P picture of the frame that is 15 frames earlier than the current frame and obtains the resultant block difference value BDd.

The compression controlling device 6 compares the change width BDd with a predetermined reference value VBDd1 at step S14. When the determined result at step S14 is Yes (namely, BDd>VBDd1), the compression controlling device 6 determines that a change takes place in the input moving picture sequence. On the other hand, when the determined result at step S14 is No (namely, BDd≦VBDd1), the compression controlling device 6 determines that a change does not take place in the input moving picture sequence. Such a determination is performed by detecting a large increase of the block difference value due to a large motion of the input moving picture sequence or a large decrease of the block difference value due to a sudden stop of the motion of the input moving picture sequence.

As described above, according to the embodiment of the present invention, the compression controlling device 6 shown in FIG. 1 compression-encodes a regular size moving picture sequence and successively records the resultant bit stream to a record medium such as an optical disc or the like. At the same time, the compression controlling device 6 stores thumbnail pictures to the frame memory. After the moving picture sequence has been completely photographed, the compression controlling device 6 compression-encodes the thumbnail pictures and records the resultant bit stream to the record medium.

According to the above-described embodiment, as an index for detecting a change of an input moving picture sequence, a block difference value motion-compensated for each macro block for detecting a moving vector is used. However, it should be noted that the present invention is not limited to such a structure. In other words, it is important to effectively decide a frame for which a thumbnail picture is generated. To do that, a particular function for detecting a change of an input moving picture sequence is required.

In the above description, the block difference value is calculated and referenced for only a P picture of the GOP structure according to the MPEG standard. Alternatively, a B picture can be used. In addition, when a change of block difference values is calculated, they are compared at intervals of 15 frames (namely, the block difference value of the current frame and the block difference value of the frame that is 15 frame earlier than the current frame are compared). However, the intervals are not limited to 15 frames.

According to the above-described embodiment of the present invention, thumbnail pictures that have not been compressed are successively stored to the frame memory 12. After a regular size moving picture sequence is completely photographed, the thumbnail pictures are compression-encoded and recorded to a record medium. However, when the system quickly generates and compression-encodes thumbnail pictures, while a regular size picture sequence is being photographed, thumbnail pictures are compression-encoded and resultant compression-encoded data (bit stream) is stored to the frame memory 12. After the regular size moving picture sequence is completely photographed, the compression-encoded data may be read from the frame memory 12 and recorded to the record medium.

When the system quickly generates thumbnail pictures, compression-encodes them, and records them to a record medium, while a regular size moving picture sequence is being photographed, thumbnail pictures may be compression-encoded and resultant compression-encoded data (bit stream) may be recorded to the record medium.

Figure 17:
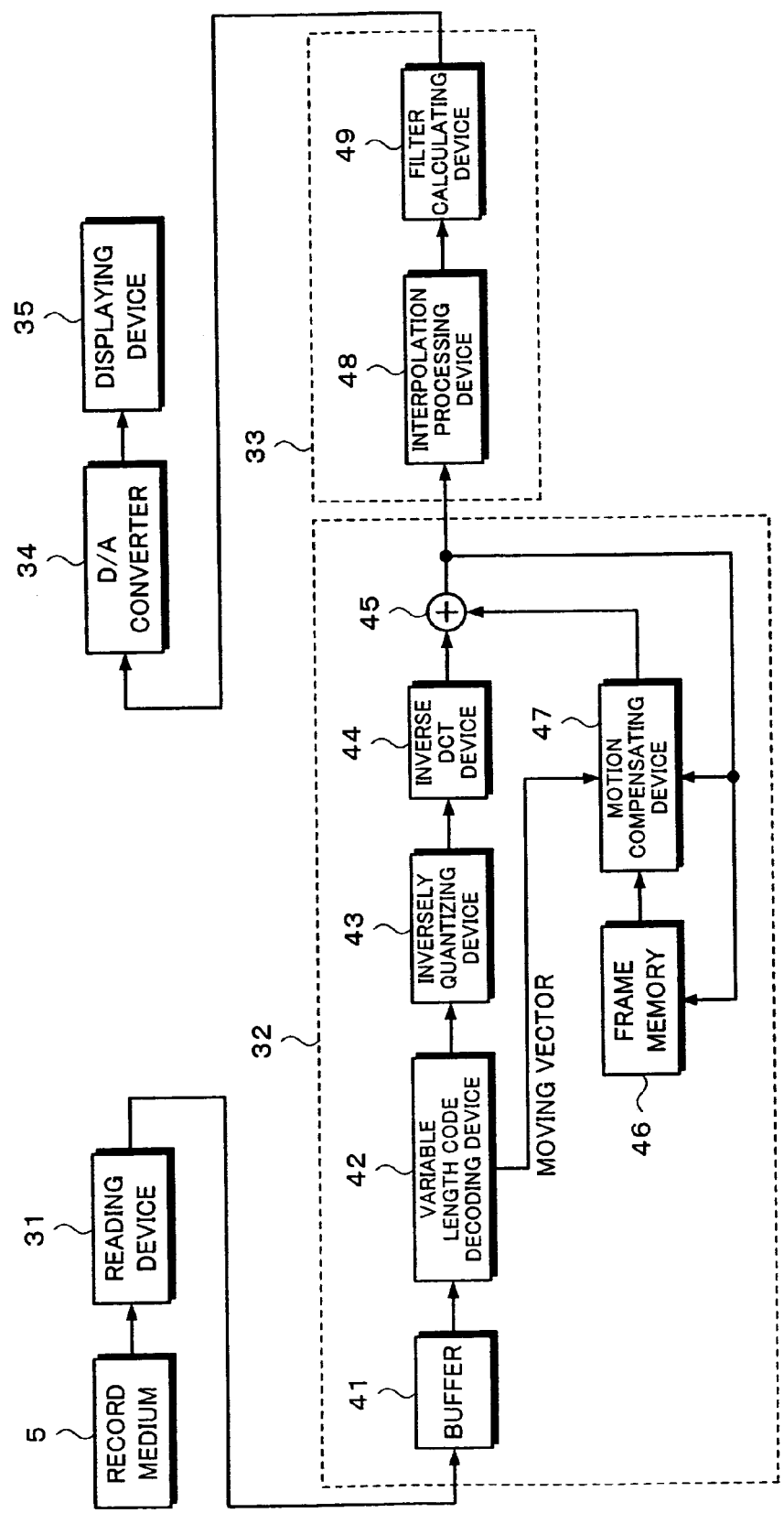
FIG. 17 is a block diagram showing an example of the structure that reproduces a thumbnail picture generated according to the embodiment of the present invention.

FIG. 17 shows an example of the structure that reproduces thumbnail pictures that have been generated in the above-described manner. Referring to FIG. 17, a reading device 31 reads a bit stream from a record medium 5. A decoding device 32 decodes the bit stream and supplies the decoded signal to a post-processing device 33. The post-processing device 33 generates a picture signal. A D/A converter 34 converts the picture signal into an analog picture signal. A displaying device 35 displays the analog picture signal.

In FIG. 17, the decoding device 32 is denoted by a dotted box. In the decoding device 32, the bit stream received from the reading device 31 is supplied to a buffer 41. An output signal of the buffer 41 is supplied to a variable length code decoding device 42. The variable length code decoding device 42 performs a variable length code decoding process for the signal received from the buffer 41. An output signal of the variable length code decoding device 42 is supplied to an inversely quantizing device 43. The inversely quantizing device 43 performs an inverse process of the quantizing process performed when a regular size picture sequence is recorded. An output signal of the inversely quantizing device 43 is supplied to an adding device 45. The adding device 45 outputs a decoded picture signal.

The decoded picture signal is supplied from the adding device 45 to a frame memory 46 and a motion compensating device 47. The frame memory 46 temporarily stores the decoded picture-signal. The motion compensating device 47 compensates the motion of a picture using a moving vector extracted by the variable length code decoding device 42. An output signal of the motion compensating device 47 is a decoded picture signal of the preceding frame. The decoded picture signal is supplied to the adding device 45. The adding device 45 adds the output signal of the motion compensating device 47 and an output signal of an inverse DCT device 44.

The adding device 45 outputs a decoded picture signal. The decoded picture signal is supplied to an interpolation processing device 48 of the post-processing device 33. A filter calculating device 49 is connected to the interpolation processing device 48. The post-processing device 33 performs an inverse process of the pre-process performed when a regular size picture sequence is recorded. The post-processing device 33 supplies a decoded picture having the original number of pixels to the D/A converter 34.

The thumbnail moving picture sequence generated corresponding to the present invention is compressed corresponding to the MPEG standard at the above-described frame intervals. Thus, the expansion-decoding process corresponding to the MPEG standard is performed in the same manner as a regular size moving picture sequence. A decoded thumbnail moving picture sequence can be displayed in several manners depending on apparatus structures.

As a first manner, a thumbnail moving picture sequence is displayed in a reduced size on the displaying device 35 such as a CRT monitor or a flat displaying device. As a second manner, a thumbnail moving picture sequence is enlarged and displayed on the entire screen. Since the second manner results in a low resolution, the first manner is preferably used. However, when the screen size is as small as the LSD monitor of a video camera, an enlarged thumbnail moving picture sequence can be displayed.

In addition, thumbnail moving picture sequences can be displayed in a divided format on the screen as shown in FIG. 9. In that case, the expanding method and displaying method of MPEG compressed data of a thumbnail moving picture sequence is different from those of a regular size moving picture sequence. In the decoding process, only I pictures should be extracted from the MPEG data and displayed at divided positions of the screen. In contrast, P pictures are not displayed.

According to the above-described embodiment, the size of each thumbnail picture is ¼ of the size of an input picture in the horizontal direction and the vertical direction. However, the size of each thumbnail picture according to the present invention is not limited to such a size. Instead, the size of each thumbnail picture should be small so that the content of the photographed moving picture sequence can be easily browsed. In addition, according to the above-described embodiment, so as to easily perform processes in the horizontal direction and vertical direction, a thumbnail picture is generated by simply thinning out pixels and lines of a regular size picture. Alternatively, as with the pre-processing device 7 used in the above-described embodiment, the thin-out process may be performed along with the frequency characteristic converting process using a digital filter.

In addition, according to the above-described embodiment, a frame for which a thumbnail picture is generated is designated corresponding to a change of an input moving picture sequence. In addition, thumbnail pictures are generated at predetermined intervals. According to the above-described embodiment, the predetermined intervals are 180 frames. However, the present invention is not limited to such frame intervals. In addition, according to the above-described embodiment, the minimum frame interval for which a thumbnail picture is generated is 30 frames. Likewise, according to the present invention, the minimum frame interval is not limited to 30 frames.

In addition, according to the above-described embodiment, a thumbnail picture area is disposed along with a regular size picture area in the frame memory of the moving picture compressing device corresponding to the MPEG standard. Alternatively, the thumbnail picture area may be disposed in an external record medium such as a semiconductor memory.

According to the above-described embodiment, when the frame memory 12 disposed in the compressing device is a general-purpose DRAM having a storage capacity of 64 Mbits, if seven frames of an input moving picture sequence (704 pixels×480 lines per frame) are used as the minimum number of frames necessary for the moving picture compression-encoding process, the maximum number of frames of thumbnail pictures (176 pixels×120 lines per frame) stored in the remaining memory becomes around 140 frames.

According to the above-described embodiment, bit stream data of which a regular size picture sequence has been compression-encoded and bit stream data of which a thumbnail moving picture sequence has been compression-encoded are recorded to a record medium such as an optical disc. However, since the amount of data of which a thumbnail moving picture sequence has been compression-encoded is small, it may be directly transmitted to a communication line such as the Internet. In other words, while a high quality moving picture sequence is being recorded to a record medium such as an optical disc, a moving picture sequence having a small amount of data such as a thumbnail moving picture sequence may be transmitted to a communication line.

As is clear from the above description, according to the present invention, while a moving picture sequence is being recorded to a record medium by a conventional moving picture camera, thumbnail pictures extracted from the moving picture sequence can be automatically generated. In other words, from a view point of the user, when the user finishes photographing a moving picture sequence, a thumbnail moving picture sequence as a summary of the moving picture sequence is automatically generated. Thus, the user can know the content of the moving picture sequence with reference to the thumbnail moving picture sequence without need to newly generate the thumbnail moving picture.

According to the present invention, since a change of an input moving picture sequence is detected and a thumbnail picture is generated at the change point, when no change takes place in the input moving picture sequence, thumbnail pictures can be prevented from being redundantly generated.

Since the data amount of a thumbnail moving picture sequence that is automatically generated according to the present invention is smaller than the data amount of a regular size moving picture sequence recorded on a record medium, the thumbnail moving picture sequence can be directly transmitted to a communication medium such as the Internet.

To accomplish the present invention, since only the thumbnail moving picture area is increased against the memory space necessary for encoding a regular size moving picture sequence, the hardware scale does not increase.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. Picture recording apparatus for compression-encoding a moving picture sequence to produce resultant data and recording the resultant data to a record medium, comprising:
   encoding means for compression-encoding an input moving picture sequence;
   recording means for recording to a recording medium compression-encoded data from said encoding means;
   extracting means for extracting a plurality of pictures from the input moving picture sequence by detecting a change of the input moving picture sequence and extracting one picture at each point of change of the input moving picture sequence while the moving picture sequence is being compressed and recorded;
   and means for compressing the extracted pictures as a second moving picture sequence while the compression-encoded data is being recorded to the record medium;

wherein a change of the input moving picture sequence is detected as a function of a block difference value corresponding to a detected moving vector.

2. The picture recording apparatus as set forth in claim 1, wherein said second moving picture sequence is recorded to a second record medium.

3. The picture recording apparatus as set forth in claim 1, wherein said second moving picture sequence is transmitted over a communication medium.

4. The picture recording apparatus as set forth in claim 1, wherein said extracting means extracts a plurality of pictures at irregular intervals.

5. The picture recording apparatus as set forth in claim 1, further comprising reducing means for reducing the extracted pictures to form reduced pictures, said reduced pictures being compressed to form said second moving picture sequence while the compression-encoded data is being recorded to the record medium.

6. The picture recording apparatus as set forth in claim 1, further comprising photographing means for inputting a photographed moving picture sequence.

7. The picture recording apparatus as set forth in claim 1, wherein said extracted pictures are compression-encoded when the compression-encoding and recording of the input moving picture sequence are completed.

8. The picture recording apparatus as set forth in claim 1, wherein said second moving picture sequence is recorded to said record medium.

9. The picture recording apparatus as set forth in claim 1, wherein said extracting means extracts a plurality of pictures from the moving picture sequence at irregular intervals starting from the first picture when the moving picture sequence is compressed and recorded.

10. The picture recording apparatus as set forth in claim 1, wherein said extracted pictures are compression-encoded by the same compression-encoding technique used for compression-encoding said input moving picture sequence.

11. The picture recording apparatus as set forth in claim 10, wherein said compression-encoding technique is MPEG.

12. The picture recording apparatus as set forth in claim 1, wherein said extracted pictures are compressed in accordance with the extracting interval.

13. A picture recording method for compression-encoding a moving picture sequence to produce resultant data and recording the resultant data to a record medium, comprising the steps of:
compression-encoding an input moving picture sequence;
recording to a recording medium compression-encoded data from said encoding means;
extracting a plurality of pictures from the input moving picture sequence;
detecting a change of the input moving picture sequence, wherein one picture at each point of change of the input moving picture sequence is extracted while the moving picture sequence is being compressed and recorded; and
compressing the extracted pictures as a second moving picture sequence while the compression-encoded data is being recorded to the record medium
wherein a change of the input moving picture sequence is detected as a function of a block difference value corresponding to a detected moving vector.

14. The picture recording method as set forth in claim 13, wherein said second moving picture sequence is recorded to a second record medium.

15. The picture recording method as set forth in claim 13, wherein said second moving picture sequence is transmitted over a communication medium.

16. The picture recording method as set forth in claim 13, wherein said plurality of pictures are extracted at irregular intervals.

17. The picture recording method as set forth in claim 13, further comprising the step of reducing the extracted pictures to form reduced pictures, said reduced pictures being compressed to form said second moving picture sequence while the compression-encoded data is being recorded to the record medium.

18. The picture recording method as set forth in claim 13, further comprising the step of inputting a photographed moving picture sequence.

19. The picture recording method as set forth in claim 13, wherein said extracted pictures are compression-encoded when the compression-encoding and recording of the input moving picture sequence are completed.

20. The picture recording method as set forth in claim 13, wherein said second moving picture sequence is recorded to said record medium.

21. The picture recording method as set forth in claim 13, wherein said plurality of pictures are extracted from the moving picture sequence at irregular intervals starting from the first picture when the moving picture sequence is compressed and recorded.

22. The picture recording method as set forth in claim 13, wherein said extracted pictures are compression-encoded by the same compression-encoding technique used for compression-encoding said input moving picture sequence.

23. The picture recording method as set forth in claim 22, wherein said compression-encoding technique is MPEG.

24. The picture recording method as set forth in claim 13, wherein said extracted pictures are compressed in accordance with the extracting interval.

* * * * *